US012562061B2

(12) United States Patent
Sur et al.

(10) Patent No.: US 12,562,061 B2
(45) Date of Patent: Feb. 24, 2026

(54) ALL WEATHER TRAFFIC MONITORING WITH ROADSIDE INFRASTRUCTURE

(71) Applicant: UNIVERSITY OF SOUTH CAROLINA, Columbia, SC (US)

(72) Inventors: Sanjib Sur, Cayce, SC (US); Hem K. Regmi, Columbia, SC (US)

(73) Assignee: UNIVERSITY OF SOUTH CAROLINA, Columbia, SC (US)

( * ) Notice: Subject to any disclaimer, the term of this patent is extended or adjusted under 35 U.S.C. 154(b) by 131 days.

(21) Appl. No.: 18/635,295

(22) Filed: Apr. 15, 2024

(65) Prior Publication Data

US 2025/0022373 A1     Jan. 16, 2025

Related U.S. Application Data

(60) Provisional application No. 63/512,712, filed on Jul. 10, 2023.

(51) Int. Cl.
*G08G 1/16* (2006.01)
*G01S 13/931* (2020.01)
*G06N 3/0475* (2023.01)

(52) U.S. Cl.
CPC ............ *G08G 1/164* (2013.01); *G01S 13/931* (2013.01); *G06N 3/0475* (2023.01); *G08G 1/166* (2013.01); *G01S 2013/9316* (2020.01)

(58) Field of Classification Search
CPC .......... G01S 2013/9316; G01S 13/931; G08G 1/166; G08G 1/164; G06N 3/0475
See application file for complete search history.

(56) References Cited

U.S. PATENT DOCUMENTS

| | | | |
|---|---|---|---|
| 7,317,406 B2 | 1/2008 | Wolterman | |
| 11,475,774 B2 * | 10/2022 | Ohlarik | G08G 1/166 |
| 11,836,852 B2 * | 12/2023 | Guan | G06N 3/094 |

FOREIGN PATENT DOCUMENTS

CN          113376600 A  *  9/2021  ............. G01S 7/414

OTHER PUBLICATIONS

Machine translation of CN-113376600-A (Year: 2021).*
(Continued)

*Primary Examiner* — Kenneth M Dunne
(74) *Attorney, Agent, or Firm* — DORITY & MANNING, P.A.

(57)          ABSTRACT

The disclosed system and methodology enable coexistence of networking and sensing on next-generation millimeter-wave (mmWave) picocells for traffic monitoring and pedestrian safety at intersections in all weather conditions. Existing wireless signal-based object detection systems suffer from limited resolution, and their outputs may not provide sufficient discriminatory information in complex scenes, such as traffic intersections. The disclosed system uses 5G picocells, which operate at mmWave frequency bands and provide higher data rates and higher sensing resolution than traditional wireless technology. It is difficult to run sensing applications and data transfer simultaneously on mmWave devices due to potential interference. MmWave devices are vulnerable to weak reflectivity and specularity challenges which may result in loss of information about objects and pedestrians. To address such challenges, the disclosed design uses customized deep learning models that not only can recover missing information about the target scene but also enable coexistence of networking and sensing.

23 Claims, 13 Drawing Sheets

(56) References Cited

OTHER PUBLICATIONS

Hem Regmi and Sanjib Sur, "CoSense: Deep Learning Augmented Sensing for Coexistence with Networking in Millimeter-Wave Picocells", 2024, ACM (Year: 2024).*

Hem Regmi and Sanjib Sur, "D3PicoNet: Enabling Fast and Accurate Indoor D-Band Millimeter-Wave Picocell Deployment" , 2023, IEEE (Year: 2023).*

Centers for Disease Control and Prevention, "Pedestrian Safety," 2022. [Online]. Available: https://www.cdc.gov/transportationsafety/pedestrian_safety/index.html.

Chen et al. "Monocular 3d object detection for autonomous driving," in Proceedings of the IEEE conference on computer vision and pattern recognition, 2016.

Devalla et al. "Design and development of object recognition and sorting robot for material handling in packaging and logistic Industries," International Journal of Science and Advanced Technology, vol. 2, No. 9, 2012.

Dhabliya et al. "Object Detection and Sorting using IoT," International Journal of New Practices in Management and Engineering, vol. 3, No. 04, 2014.

Donner, "DMF-400S," 2023. [Online]. Available:https://www.amazon.com/Donner-Christmas-Halloween-Thanksgiving-DFM-400S/dp/B097MRZL9Z?th=1.

Feng et al., "A review and compara-tive study on probabilistic object detection in autonomous driving," IEEE Transactions on Intelligent Transportation Systems, vol. 23, No. 8, 2021.

Ge et al. "Fictitious GAN: Training GANs with Historical Models," in European Conference on Computer Vision ECCV 2018, 2018.

Golovachev et al. "Millimeter Wave High Resolution Radar Accuracy in Fog Conditions—Theory and Experimental Verification," MDPI Sensors, vol. 18, No. 7, 2018.

Golovachev et al. "Propagation Properties of Sub-Millimeter Waves in Foggy Conditions," *Journal of Applied Physics,* vol. 125, No. 151612, 2019.

Goodfellow et al. "Generative Adversarial Networks," in ACM International Conference on Neural Information Processing Systems, 2014.

Governors Highway Safety Association (GHSA), "New Projection: U.S. Pedestrian Fatalities Reach Highest Level in 40 Years," 2022. [Online]. Available: https://www.ghsa.org/resources/news-releases/GHSA/Ped-Spotlight-Full-Report22.

Guan et al. "Through fog high-resolution imaging using millimeter wave radar," in Proceedings of the IEEE/CVF Conference on Computer Vision and Pattern Recognition, 2020.

He et al. "Mask R-CNN," in 2017 IEEE International Conference on Computer Vision (ICCV), 2017.

Hore et al. "Image quality metrics: PSNR vs. SSIM," in 2010 20th international conference on pattern recognition. IEEE, 2010, pp. 2366-2369.

James et al. "Estimation with quadratic loss," Breakthroughs in statistics: Foun-dations and basic theory, pp. 443-460, 1992.

Kumar et al. "Yolov3 and yolov4: Multiple object detection for surveillance applications," in 2020 Third international conference on smart systems and inventive technology (ICSSIT). IEEE, 2020.

Madani et al. "Radatron: Accurate detection Using Multi-resolution Cascaded MIMO Radar," in Computer Vision—ECCV 2022: 17th European Conference, Tel Aviv, Israel, Oct. 23-27, 2022, Proceedings, Part XXXIX, 2022.

Mamandipoor et al. "60 GHz Synthetic Aperture Radar for Short-Range Imaging: Theory and Experiments," in IEEE Asilomar Conference on Signals, Systems and Computers, 2014.

Mao et al. "Image restoration using convolutional auto-encoders with symmetric skip connections," arXiv preprint arXiv:1606.08921, 2016.

Marcus et al. "Millimeter wave propagation: spectrum management implications," IEEE Microwave Magazine, vol. 6, No. 2, 2005.

Mirza et al. "Conditional Generative Adversarial Nets," 2014. [Online]. Available: https://arxiv.org/abs/1411.1784.

Rappaport et al. "Millimeter Wave Wireless Communications". Prentice Hall, 2014.

SAE International, "Taxonomy and Definitions for Terms Related to Driving Automation Systems for On-Road Motor Vehicles," 2022. [Online]. Available: https://www.sae.org/standards/content/j3016_202104/.

Saini et al. Abstract Only "Object Detection in Surveillance Using Deep Learning Methods: A Comparative Analysis," in Inventive Computation and Information Technologies: Proceedings of ICICIT 2020, 2021.

Sandler et al. "Mobilenetv2: Inverted residuals and linear bottlenecks," in Proceedings of the IEEE conference on computer vision and pattern recognition, 2018.

Sheen et al. "Three-Dimensional Millimeter-Wave Imaging for Concealed Weapon Detection," IEEE Transactions on Microwave Theory and Techniques, vol. 49, No. 9, 2001.

Sur et al. "60 GHz Indoor Networking through Flexible Beams: A Link-Level Profiling," in Proc. of ACM SIGMETRICS, 2015.

Tschannen et al. "Recent advances in autoencoder-based representation learning," *arXiv preprint arXiv: 1812.05069,* 2018.

U.S. Department of Transportation—Federal Highway Administration, "About Intersection Safety," 2022. [Online]. Available: https://safety.fhwa.dot.gov/intersection/about/.

We et al. "The Human Body and Millimeter-Wave Wireless Communication Systems: Interactions and Implications," in *2015 IEEE International Conference on Communications (ICC),* 2015.

Weich et al. "Development of an optical object detection solution for defect prevention in a Learning Factory," *Procedia Manufacturing,* vol. 9, 2017.

Xu et al. "Understanding Operational 5G: A First Measurement Study on Its Coverage, Performance and Energy Consumption," in *ACM SIGCOMM,* 2020.

Zhang et al. "mmEye: Super-Resolution Millimeter Wave Imaging," *IEEE Internet of Things Journal,* vol. 8, No. 8, 2021.

* cited by examiner

Table 1
| | 2DC1 | 2DC2 | 2DC3 | 2DC4 | 2DC5 | 2DC6 | 2DC7 | 2DTC1 | 2DTC2 | 2DTC3 | 2DTC4 | 2DTC5 | 2DTC6 | 2DTC7 | Output |
|---|---|---|---|---|---|---|---|---|---|---|---|---|---|---|---|
| Filter # | 16 | 32 | 64 | 128 | 256 | 512 | 1024 | 1024 | 512 | 256 | 128 | 64 | 32 | 16 | |
| Filter Size | 3x3 | 3x3 | 3x3 | 3x3 | 3x3 | 3x3 | 3x3 | 2x2 | 2x2 | 2x2 | 2x2 | 2x2 | 2x2 | 2x2 | |
| Dilation | 2x2 | 2x2 | 2x2 | 2x2 | 2x2 | 2x2 | 2x1 | | | | | | | | |
| Act. Fcn | LRelu | LRelu | LRelu | LRelu | LRelu | LRelu | LRelu | LRelu | LRelu | LRelu | LRelu | LRelu | LRelu | LRelu | Linear |
FIG. 4
Table 2
| | 2DC1 | 2DC2 | 2DC3 | 2DC4 | 2DC5 | 2DC6 | 2DC7 | FC1 | FC2 | Output |
|---|---|---|---|---|---|---|---|---|---|---|
| Filter # | 16 | 32 | 64 | 128 | 256 | 512 | 1024 | | | |
| Filter Size | 3x3 | 3x3 | 3x3 | 3x3 | 3x3 | 3x3 | 3x3 | | | |
| Dilation | 2x2 | 2x2 | 2x2 | 2x2 | 2x2 | 2x2 | 2x2 | | | |
| Act. Fcn | LRelu | LRelu | LRelu | LRelu | LRelu | LRelu | LRelu | LRelu | LRelu | Sigmoid |
FIG. 5
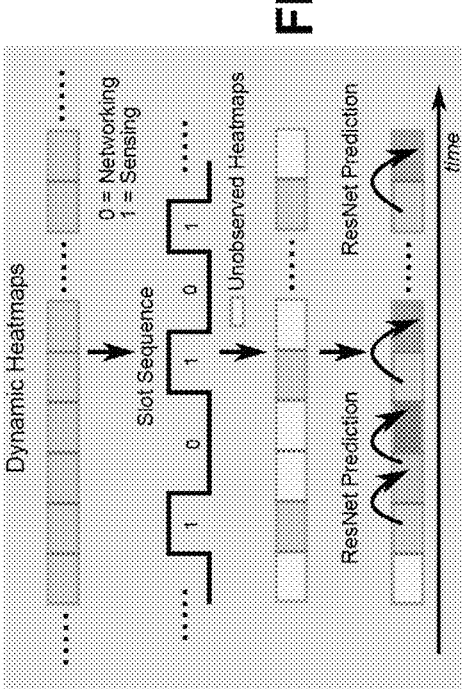
FIG. 6(b)
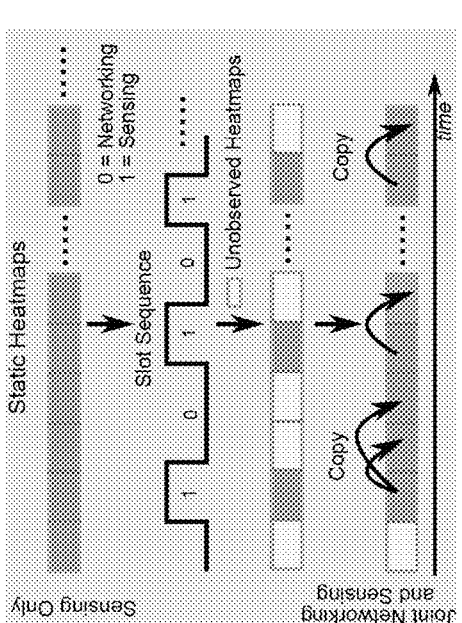
FIG. 6(a)

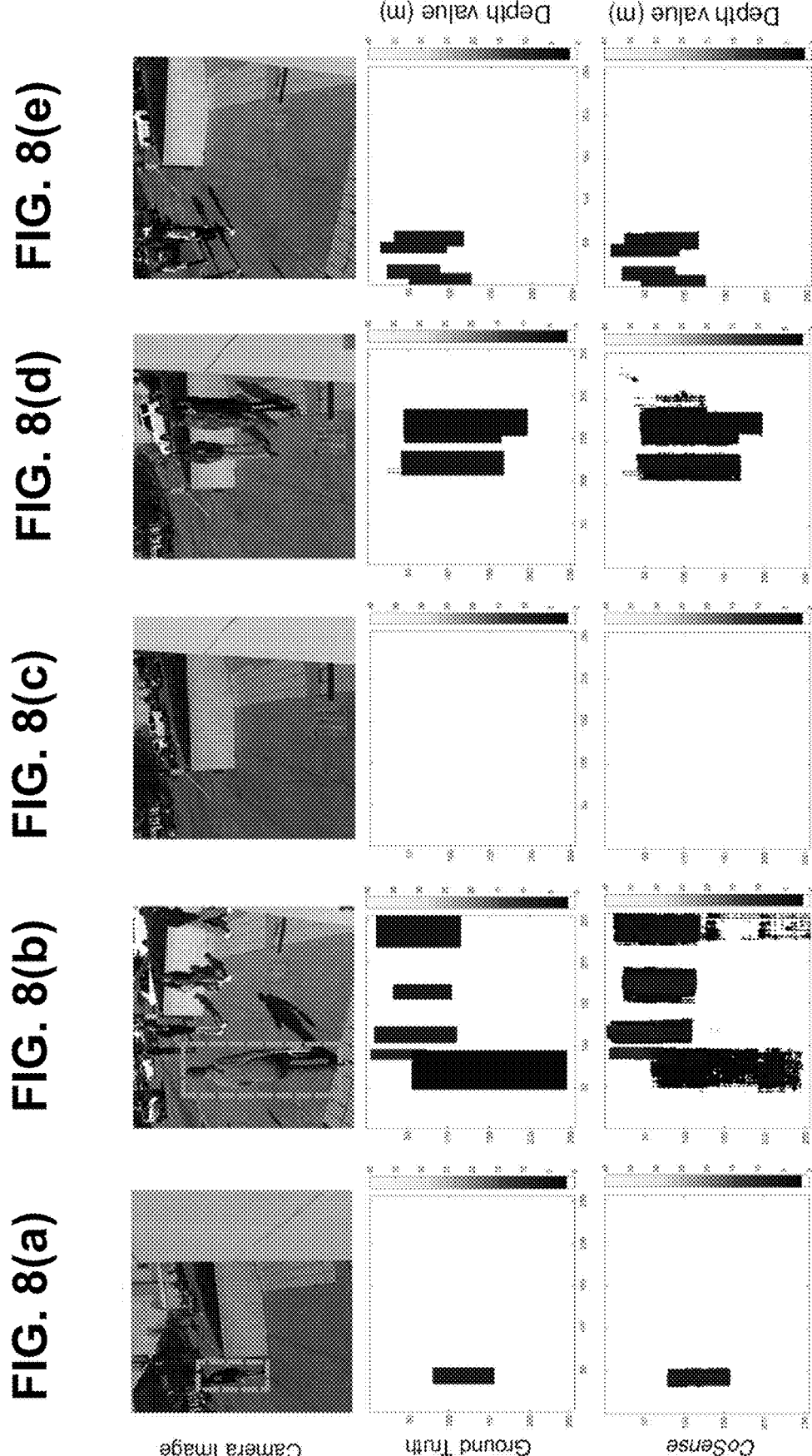

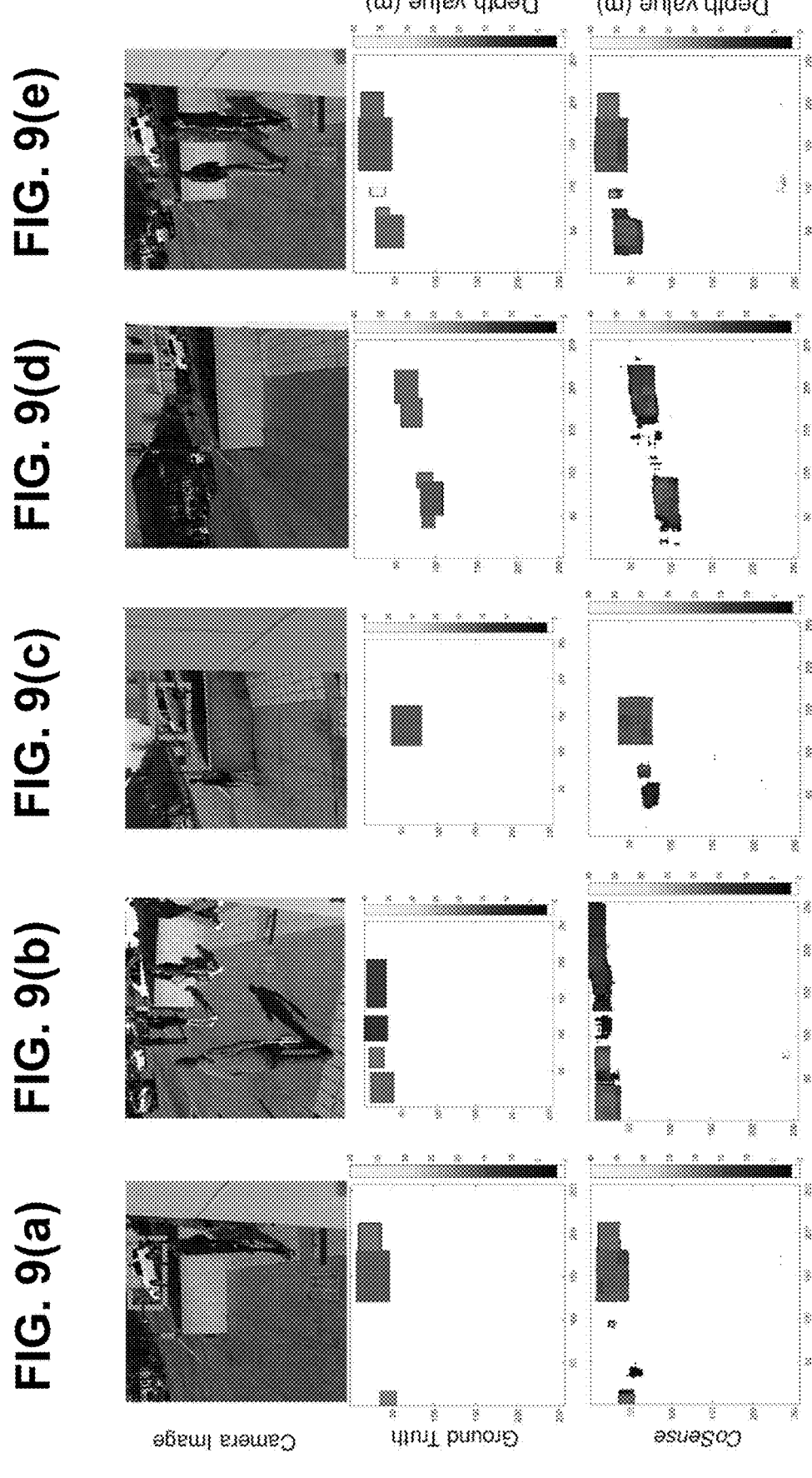

FIG. 13(b)
Camera Image

Fog Experimental Setup

Fog Generator mmWave cascade device 1.55 m

Table 3

| CoSense | #Samples | Depth Error (median) | Depth Error (90$^{th}$%-ile) | IoU (Median) | IoU (90$^{th}$%-ile) | MS-SSIM (Median) | MS-SSIM (90$^{th}$%-ile) |
|---|---|---|---|---|---|---|---|
| Pedestrian 1 | 152 | 0.03 m | 0.05 m | 0.78 | 0.84 | 0.93 | 0.94 |
| Pedestrian 2 | 184 | 0.02 m | 0.13 m | 0.89 | 0.93 | 0.94 | 0.95 |

ALL WEATHER TRAFFIC MONITORING WITH ROADSIDE INFRASTRUCTURE

PRIORITY CLAIM

The present application claims the benefit of priority of U.S. Provisional Patent Application No. 63/512,712, filed Jul. 10, 2023, which is titled All Weather Traffic Monitoring With Roadside Infrastructure, and which is fully incorporated herein by reference for all purposes.

STATEMENT REGARDING SPONSORED RESEARCH OR DEVELOPMENT

This invention was made with government support under Grant Number 2144505, awarded by the National Science Foundation. The government has certain rights in the invention.

BACKGROUND OF THE PRESENTLY DISCLOSED SUBJECT MATTER

1. Importance, Challenges, and Prior Works

In 2021, a staggering 7,500 pedestrian fatalities were reported in the United States as a result of vehicular collisions [1]. According to the US Department of Transportation, over 50% of fatal or injurious road accidents occur at or in close proximity to traffic intersections [2]. Most, if not all, of these deaths and injuries can be prevented by proactively warning the drivers, vehicles, and pedestrians [3]; for example, by notifying the pedestrian of oncoming vehicles during cross walk or by enabling smarter speed control for vehicles near traffic interactions. While the advent of full driving automation (i.e., Level 5 autonomy [4]) holds promise for a future without such tragedies, there is a pressing need for an interim solution at intersections to reduce the frequency of these incidents. Such a system can also collect important statistics and telemetry information, such as real-time pedestrian and vehicular traffic at intersections, their speeds, vehicle proximity to intersection stop bars, occupied lanes, and vehicle types, which can enable a variety of applications related to traffic monitoring and management. Existing vision-based sensors, such as cameras and LiDARs, provide powerful tools to not only measure such traffic behavior at intersections but also improve pedestrian safety. But the performance of the vision-based sensors are often significantly impaired by the scene conditions, such as no ambient lights or poor visibility during night time, heavy rain, or dense fog.

Wireless signal based object detection systems can alleviate such a problem. A wireless device can illuminate the target scene by transmitting wireless signals and receiving them bounce off of different objects. Based on the time-of-flight and angle of reflections, this device can map the entire environment and "see" the static and dynamic objects within it, even under low visibility and poor weather conditions. Next-generation wireless networking devices operating at higher frequency, such as 5G picocells [5], offers a solution to this issue. These networking devices have built-in millimeter-wave (mmWave) technology, which offers a substantially higher data rate than traditional wireless technology and can host multiple, palm-sized antenna arrays to create hundreds of beams for serving mobile users. Due to the short wavelength and wide bandwidth operation of mmWave signals, each picocell can also function as a high-precision environment sensor. So, these devices can be augmented into roadside infrastructures, particularly at traffic intersections, to provide high-resolution monitoring of vehicles and pedestrians. MmWave devices provide an advantage over camera-based systems during poor weather and low visibility conditions, as wireless signals can penetrate through some obstructions like dense fog, while lights cannot. So, the ubiquity of mmWave technology in 5G-and-beyond devices, such as the picocells in roadside infrastructure, enables the opportunity to bring traffic monitoring and pedestrian safety at intersections in all weather conditions.

However, the design of mmWave sensing on networking devices presents two challenges.

First, although mmWave devices are good environmental sensors, it is difficult to simultaneously run sensing applications and data transfer. For instance, if a pedestrian walks in front of a mmWave picocell while it is streaming data, it can disrupt the Line-of-Sight (LOS) communication path. While its beam can be steered towards the Non-Line-of-Sight (NLOS) path or networking and sensing operations can be time-multiplexed to reduce interference, these can negatively impact both pedestrian detection accuracy and network performance by reducing throughput, increasing latency, and disrupting the delivery of packets to critical applications. A strawman approach for networking-sensing coexistence is to augment devices with special-purpose sensing hardware to use different parts of the mmWave spectrum and avoid interference. But this will prohibit deployment of the sensing applications to a large number of existing and future inexpensive mmWave devices.

Second, mmWave devices are vulnerable to more specular and variable reflectivity challenges (compared to Wi-Fi or LTE) due to their high-frequency operations. So, depending on the location, orientation, and absorption properties of objects and pedestrians on the road, the signals transmitted may not reach back to the device [6, 7, 8, 9, 10, 11, 12, 13]. This can result in a loss of information about objects and pedestrians, as well as difficulties in accurately capturing their properties.

SUMMARY OF THE PRESENTLY DISCLOSED SUBJECT MATTER

The presently disclosed system would offer an advantage of providing a system that enables coexistence of networking and sensing on next-generation millimeter-wave (mmWave) picocells. Further, presently disclosed subject matter in some instances may relate to deep learning augmented object detection with mmWave devices.

2. Disclosed Approach

We presently disclose a system that we refer to as "CoSense." The presently disclosed system enables coexistence of networking and sensing on next-generation millimeter-wave (mmWave) picocells for traffic monitoring and pedestrian safety at intersections in all weather conditions.

Although existing wireless signal-based object detection systems are available, they suffer from limited resolution, and their outputs may not provide sufficient discriminatory information in complex scenes, such as traffic intersections. CoSense discloses using 5G picocells, which operate at mmWave frequency bands and provide higher data rates and higher sensing resolution than traditional wireless technology. However, it is difficult to run sensing applications and data transfer simultaneously on mmWave devices due to potential interference, and using special-purpose sensing hardware can prohibit deployment of sensing applications to a large number of existing and future inexpensive mmWave devices. Additionally, mmWave devices are vulnerable to weak reflectivity and specularity challenges which may result in loss of information about objects and pedestrians.

To overcome such challenges, the presently disclosed CoSense system design uses customized deep learning models that not only can recover missing information about the target scene but also enable coexistence of networking and sensing. This disclosure offers evaluation of the presently disclosed CoSense system on diverse data samples captured at traffic intersections, and demonstrates that it can detect and locate pedestrians and vehicles, both qualitatively and quantitatively, without significantly affecting the networking throughput.

It is to be understood that embodiments of the presently disclosed subject matter equally relate to devices and systems as well as associated and/or corresponding methodologies. One exemplary such method relates to methodology for vehicle and pedestrian monitoring for safety at traffic intersections in all weather conditions. Such exemplary methodology may preferably comprise providing a plurality of 5g picocells, operating at mmWave frequency bands, and associated with at least one target traffic intersection scene to be monitored; obtaining reflected mmWave data from the plurality of picocells associated with the at least one target scene; and inputting the obtained reflected mmWave data into a deep learning model trained to recover missing data about the target scene from the obtained reflected mmWave data while enabling coexistence of networking and sensing by the picocells.

Other example aspects of the present disclosure are directed to systems, apparatus, tangible, non-transitory computer-readable media, user interfaces, memory devices, and electronic devices for vehicle and/or pedestrian monitoring. To implement methodology and technology herewith, one or more processors may be provided, programmed to perform the steps and functions as called for by the presently disclosed subject matter, as will be understood by those of ordinary skill in the art.

Another exemplary embodiment of presently disclosed subject matter relates to methodology for vehicle and pedestrian monitoring for safety at traffic intersections in all weather conditions. Such exemplary methodology preferably comprises providing a deep-learning model trained with reflected mmWave data from a plurality of picocells associated with at least one target intersection, to recover missing data about the target scene from the obtained reflected mmWave data; one or more processors; and one or more non-transitory computer-readable media that store instructions that, when executed by the one or more processors, cause the one or more processors to perform operations. Such operations preferably comprise operating at mmWave frequency bands a plurality of 5g picocells, associated with the at least one target traffic intersection to be monitored; and conducting collision prevention through at least one of warning pedestrian traffic and vehicle control, based on model output.

Additional objects and advantages of the presently disclosed subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments, uses, and practices of the presently disclosed subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the presently disclosed subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the presently disclosed subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification, and will appreciate that the presently disclosed subject matter applies equally to corresponding methodologies as associated with practice of any of the present exemplary devices, and vice versa.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which:

FIG. 4 illustrates a table (Table 1) providing exemplary details of the convolution layers and deconvolution layers of exemplary Generator (G) network parameters for the exemplary embodiments of FIGS. 1 and 2, including the number of filters, filter size, activation on each layer, and spatial dimension dilation;

FIG. 5 illustrates a table (Table 2) providing exemplary details summarizing exemplary Discriminator (D) network parameters for the exemplary embodiments of FIGS. 1 and 3;

FIGS. 6(a) and 6(b), graphically illustrate, respectively, exemplary static and dynamic heatmap recovery processes of the presently disclosed system (CoSense);

FIGS. 8(*a*) through 8(*e*) each graphically and visually represent respective example results of presently disclosed subject matter for pedestrian detection at a traffic intersection, showing generated bounding boxes for multiple pedestrians in respective sample test cases;

FIGS. 9(*a*) through 9(*e*) each graphically and visually represent respective example results of presently disclosed subject matter for vehicle detection at a traffic intersection, showing generated bounding boxes for multiple vehicles in respective sample test cases;

FIG. 13(*a*) visually illustrates an example of an experimental setup used with testing the presently disclosed subject matter, and including an exemplary fog machine;

FIGS. 13(*b*) and 13(*c*) show two respective exemplary images under created medium and poor visibility (various foggy conditions), respectively, utilizing the fog generator arrangement represented in present FIG. 13(*a*);

FIG. 13(*d*) graphically illustrates two respective exemplary dynamic and static heatmap images created under the medium and poor visibility conditions represented per FIGS. 13(*b*) and 13(*c*), respectively;

FIG. 13(*e*) graphically illustrates two respective mapped bounding boxes, created by the presently disclosed CoSense system, for the two pedestrians images under the medium and poor visibility conditions represented per FIGS. 13(*b*) and 13(*c*), respectively.

Figure 1:
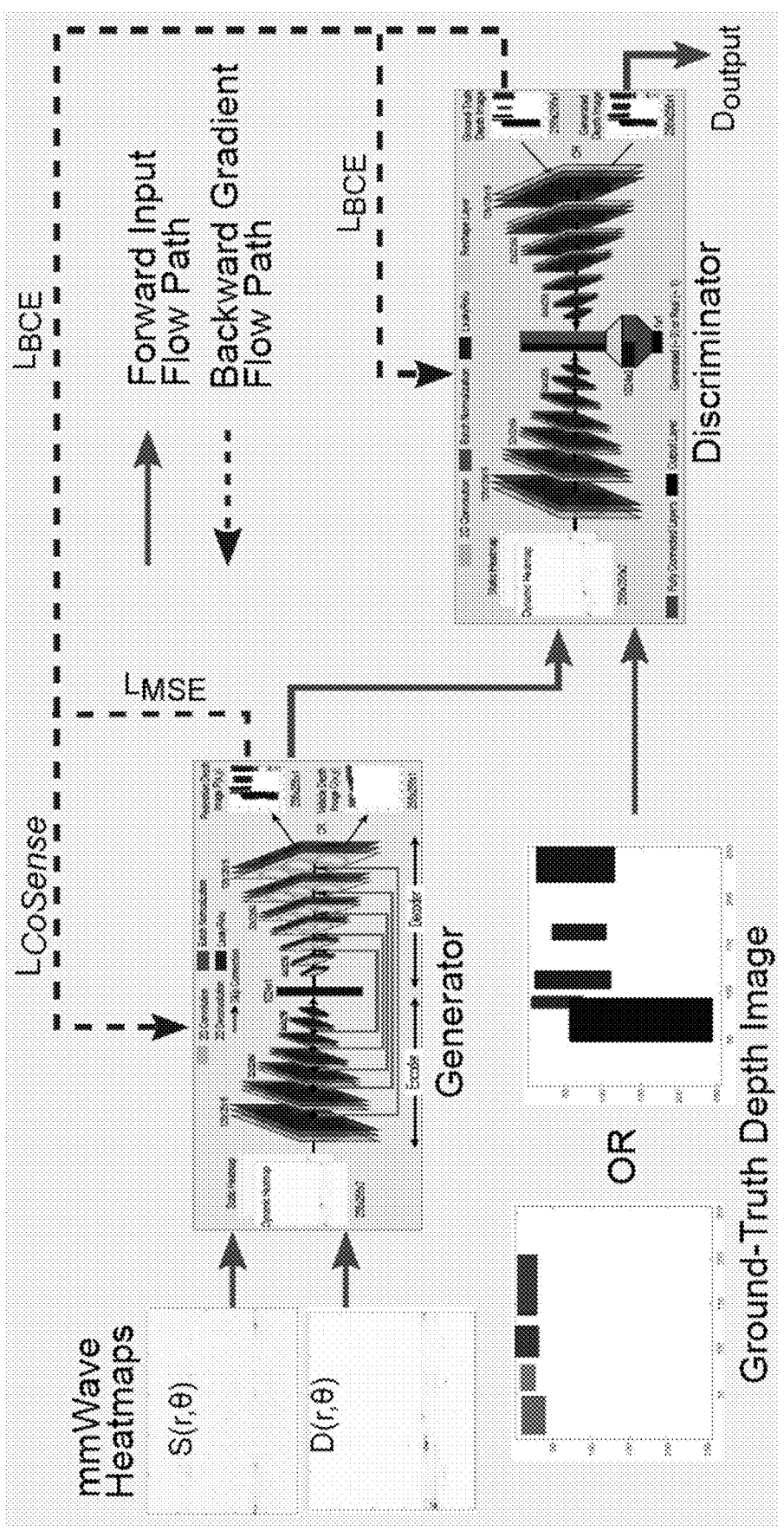
FIG. 1 illustrates a schematic of an exemplary presently disclosed learning framework (conditional Generative Adversarial Networks (cGAN) network) of the presently disclosed system (CoSense), including representing a base model having a Generator (G) and Discriminator (D)

Repeat use of reference characters in the present specification and drawings is intended to represent the same or analogous features, elements, or steps of the presently disclosed subject matter.

DETAILED DESCRIPTION OF THE PRESENTLY DISCLOSED SUBJECT MATTER

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

In general, the present disclosure is directed to system and methodology subject matter for vehicle and pedestrian monitoring for safety at traffic intersections in all weather conditions.

2.1 Design
2.1.1 Deep Learning Augmented Object Detection with mmWave Device

Object detection is a critical task for many applications, including industrial automation [14, 15, 16], autonomous driving [17, 18], and monitoring and surveillance [18, 19, 20]. Most of the applications rely on the acquisition of visual images to first extract the useful features and then use that particular features for robust object detection and segmentation. The presently disclosed system, CoSense, however, relies on objects and pedestrians detection from incomplete mmWave wireless signals from picocells. Even though existing Mask RCNN approach are effective for vision images, which isolates Regions-Of-Interest (ROI) and extracts features for classification, we cannot use the Mask RCNN network architecture directly because of the two following challenges with mmWave wireless signals: (1) the limited object details due to specularity and weak reflectivity of signals, where reflections of not all transmitted signals reach the receiver; and (2) the intermittent capture of target scene information due to joint networking and sensing.

To address such issues, the presently disclosed system (CoSense) uses the conditional Generative Adversarial Networks (cGAN) [22], which has multiple 2D convolution layers, 2D deconvolution layers, and skip connections on its Generator network to produce 2D bounding box depth images from mmWave heatmaps. Next, we outline the steps involved in base model for object detection using all data samples, dynamic heatmap recovery from missing data samples, and final object detection with recovered frames.

GAN Fundamentals: Generative networks are similar to the spirit of autoencoder [24], which uses the few random samples to learn the data distribution during the training. After training is complete, a generator network can generate new samples that are never existed using the random noise [25]. Generative modeling is popular in synthetic data generation, where thousands of new samples are generated from few observations. GAN uses two sub-models during training: (1) Generator G, which tries to generate samples close to real samples; and (2) Discriminator D, which predicts if the data sample generated (by G) is real or not. Output is the probability of sample being real, ~1 indicates real and ~0 indicates generated. During the training, it is formulated as an adversarial game [26], until G completely fools D, which indicate D now thinks generated samples are real samples. However, if we provide only random noise to the generative networks, it can produce any category of output, and output data distribution is not controlled. Therefore, we use mmWave heatmaps as condition to GAN, and use cGAN network because ground-truth depth images are in same FoV and timestamp as mmWave heatmaps.

Base Model Object Detection with cGAN: The base model for object detection assumes that the device continuously captures information about the target scene. We will then augment the model for intermittently captured data samples.

FIG. 1 illustrates a schematic of an exemplary presently disclosed learning framework (conditional Generative Adversarial Networks (cGAN) network) of the presently disclosed system (CoSense). In other words, it shows the CoSense cGAN network and its data flow paths. An exemplary base model includes a Generator (G) and a Discriminator (D). We create two instances of the base model with same network architecture for pedestrians and vehicles. During training, we update the network parameters of each of these model instances with mmWave heatmaps and corresponding ground-truth depth images of pedestrians and vehicles, respectively.

7

Figures 2, 3:
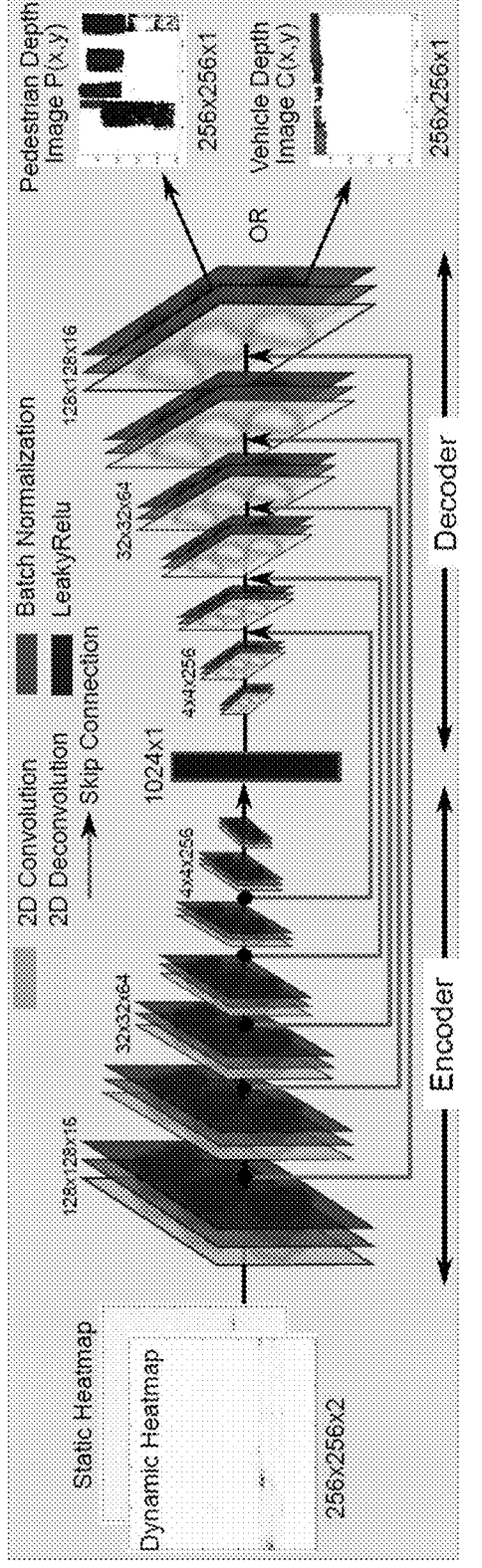
FIG. 2 illustrates a schematic of an exemplary Generator (G) network architecture for the exemplary embodiment of present FIG. 1.
FIG. 3 illustrates a schematic of an exemplary Discriminator (D) network architecture for the exemplary embodiment of present FIG. 1.

Generator: FIG. 2 illustrates a schematic of an exemplary Generator (G) network architecture for the exemplary embodiment of present FIG. 1, which is a base model, where we design a deep learning network with an encoder and decoder that converts the mmWave heatmaps into 2D bounding boxes with depth values. After static and dynamic heatmaps of size 256×256×1 are merged in channel dimension at the input layer to create a single input of size 256×256×2, multiple 2D convolution layers of G's encoder extract the local and global features from mmWave heatmaps on successive layers and locates all the objects. Encoder network uses batch normalization and LeakyRelu activation after each 2D convolution layer to make training faster and stable. Besides, skip connections [23, 9] between successive layers of encoder and decoder preserves the details present in mmWave heatmaps and pass it to the generated depth images. Once encoder network generates 1D abstract feature vector, we then use the decoder to convert the abstract feature vector into 2D depth image by expanding its spatial dimension. The decoder network is composed of 2D deconvolution layers with batch normalization and LeakyReLU activation, similar to an up-sampling process where the network increases its spatial dimensions continuously until the desired output shape is reached. FIG. 4 illustrates a table (Table 1) providing exemplary details of the convolution layers and deconvolution layers of exemplary Generator (G) network parameters for the exemplary embodiments of FIGS. 1 and 2, including the number of filters, filter size, activation on each layer, and spatial dimension dilation. For example, FIG. 4 (Table 1) refers to exemplary Generator (G) network parameters, 2DC: 2D Convolution (with batch normalization); 2DDC: 2D DeConvolution (with batch normalization); Act. Fcn: Activation Function; LRelu: LeakyRelu activation function; with 5 skip connections between 2DC and 2DDC layers; and with the Output layer using linear activation.

Discriminator: Discriminator's primary goal is to guide G during the training process. The Generator tries to use the mmWave heatmaps and learns to generate output close to ground-truth depth images. FIG. 3 illustrates a schematic of an exemplary Discriminator (D) network architecture for the exemplary embodiment of present FIG. 1. The exemplary Discriminator (D) has two encoders, Encoder A and Encoder B, to extract features from mmWave heatmaps and ground-truth depth images, respectively. Both encoder network architectures are similar to Generator's encoder network architecture. Encoder A converts the mmWave heatmaps of size 256×256×2 to abstract feature vector of size 1024×1, following multiple 2D convolution, batch normalization, LeakyRelu activation. Encoder B similarly converts depth image of size 256×256×1 to 1D feature vector of size 1024×1. Finally, D combines 1D abstract features from mmWave heatmaps and ground-truth depth images and reshapes them to a long 1D vector of size 2048×1, and then passes through 2 fully connected layers to generate the output probability of a value between 0 and 1 with a sigmoid activation function on its output layer. The output probability indicates the closeness of the input depth image to the ground truth depth image. We end training when D continuously outputs a probability close to 0.5 for all the samples, which suggests that D can no longer distinguish between ground truth and generated samples. Once this stage of training is reached, G generates depth images with the same data distribution as ground-truth depth images.

FIG. 5 illustrates a table (Table 2) providing exemplary details summarizing exemplary Discriminator (D) network parameters for the exemplary embodiments of FIGS. 1 and

8

3. For example, FIG. 5 (Table 2) refers to exemplary Discriminator (D) network parameters, 2DC: 2D Convolution (with batch normalization); Act. Fcn: Activation Function; LRelu: LeakyRelu activation function; Output layer uses Sigmoid activation.

2.1.2 Context-Aware Object Detection with cGAN

While the base model assumes that sensing samples are continuously available, in practice, simultaneous networking and sensing on a picocell can result in intermittent availability of the sensing samples. To recover the missing sensing samples, we disclose context-aware object detection with cGAN. To achieve communication and sensing tasks, we use the "slot sequence" ($S_{timestamps}$) from the 5G network protocol. During the learning phase, we can drop the mmWave sensing samples to emulate the networking slots, and push our system closer to the actual hardware that performs both communication and sensing tasks. With fewer mmWave samples available, CoSense has a limited ability to detect and locate pedestrians and vehicles. Furthermore, we assign most of the time slots to network communication since the picocell's primary function is to support required data throughput. We improve our heatmap prediction process by estimating the static and dynamic heatmaps based on the past few observed heatmaps. We expect the static heatmap to be primarily stationary and exhibit minor changes, while the dynamic heatmap with moving pedestrians and vehicles could change significantly, such as when new objects enter or leave the field of view. FIGS. 6(*a*) and 6(*b*), graphically/schematically illustrate, respectively, exemplary static and dynamic heatmap recovery processes of the presently disclosed system (CoSense). More particularly, FIGS. 6(*a*) and 6(*b*) illustrate, respectively, exemplary process(es) of removing and recovering static and dynamic heatmaps based on different slot sequence configurations.

Figure 7:
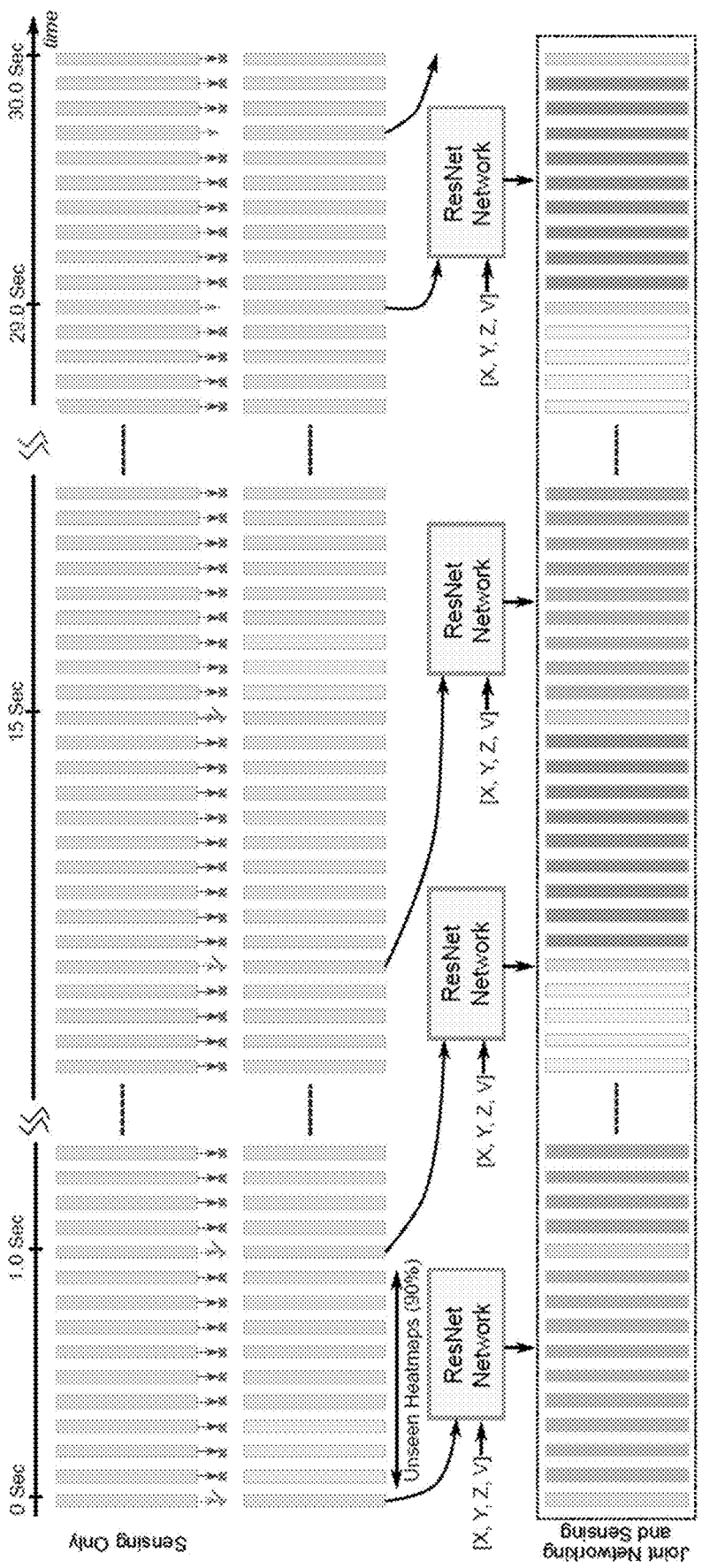
FIG. 7 graphically illustrates an example of the dynamic heatmap prediction process with residual network (ResNet18) for a complete batch of data (with 90% unseen sensing samples), in accordance with an exemplary embodiment of presently disclosed subject matter.

FIG. 7 represents the deep learning architecture for predicting dynamic heatmap, which utilizes the previous dynamic heatmap and the dominant reflecting points along with their corresponding velocities to forecast the movements of objects in future dynamic heatmaps. More particularly, FIG. 7 graphically illustrates an example of the dynamic heatmap prediction process with residual network (ResNet18) for a complete batch of data (with 90% unseen sensing samples), in accordance with an exemplary embodiment of presently disclosed subject matter. The underlying idea is that passing the prior dynamic heatmap alongside the group of points with velocity property will facilitate the generation of the dynamic heatmap based on the direction and speed of objects in the heatmap. Following multiple convolution layers of various filter sizes and a series of activation functions of residual networks [27], we obtain an abstract feature vector $D_F$ of size 1000×1. Similarly, we encode the velocity of high signal-to-noise ratio (SNR) points (i.e., strong reflecting objects) and pass them through a series of 1D convolution layers to obtain a feature vector $V_F$ of size 50×1. Finally, we concatenate $V_F$ and $D_F$ and pass through a series of deconvolution layers to predict $D'(r, \theta)_{t+1}$ at the output layer of size 256×256. Mathematically, we can approximate this as $D'(r, \theta)_{t+1} = DHP_\beta([D(r, \theta)t, V_t])$, where $DHP_\beta$ represents the parameterized dynamic heatmap prediction network, $[D(r, \theta)t, V_t]$ is the dynamic heatmap and velocity at time t.

By leveraging the recovered dynamic heatmaps, the cGAN based object detection model can access past contextual information about the environment, which would otherwise be unattainable due to the networking and sensing obligations of the mmWave device.

Network Loss Functions: The loss function is a critical component of deep learning models that control the optimal convergence of the network. CoSense employs a combination of Mean Squared Error (MSE) [28] and Binary Cross Entropy (BCE) [29] for its cGAN learning framework. BCE measures the entropy loss of Discriminator's output, and helps to guide both Generator and Discriminator for optimal value of parameters in their networks. MSE loss is used to enforce pixel-to-pixel mapping in the reconstructed depth images. For the network training of both pedestrians and vehicles, we use a combined loss function to train cGAN with two different model instances of same network architecture. The combined loss function is given by the following equation:

$$L_{CoSense} = \lambda_{MSE} \times L_{MSE} + \lambda_{BCE} \times L_{BCE} \qquad (1)$$

where, $L_{MSE}$=MSE (G(x,y), M(x,y)) and $L_{BCE}$=BCE([D(S(r, $\theta$), D(r, $\theta$)), G(x, y) or M(x, y)], 1 or 0). G(x, y) and M(x, y) are generated depth images and ground truth depth images for pedestrians and vehicles, respectively. $\lambda_{MSE}$ and $\lambda_{BCE}$ are the hyper-parameters that control the predicted depth values of the image and bounding-box similarity, respectively, and are calculated based on the validation dataset. Finding the optimal values for hyper-parameters is tricky and requires heuristics. We expect our networks to focus on learning the accurate bounding boxes and correct depth values of the objects rather than focusing on quality of generated image. So, intuitively, we can assign higher weight to $\lambda_{MSE}$ than $\lambda_{BCE}$. Experimentally, $(\lambda_{MSE}, \lambda_{BCE})$=(1, 0.1) performs optimally for our neural network models because it aims to find maximum overlap and correct mean depth of the object. For dynamic heatmap prediction model, we use MSE between the predicted dynamic heatmap and ground-truth dynamic heatmap as the loss function to train the network.

In summary, CoSense detects pedestrians and vehicles from mmWave heatmaps, and residual network with already observed heatmaps to predict unobserved heatmaps to enable joint networking and sensing.

2.2 Results 2.2.1 Base Object Detection Model

In this section, we evaluate the performance of the CoSense model for detecting pedestrians and vehicles in traffic intersections during office working hours.

We collect 50K data samples and preprocess them to produce mmWave heatmaps and ground truth depth images. Of the 50K samples, 40K samples are used for training CoSense's base object detection model (Section 2.1.1). After training, we use the rest of the 10K samples to predict the bounding boxes for pedestrians and vehicles from mmWave signals. FIGS. 8(a) through 8(e) each graphically and visually represent respective example results of presently disclosed subject matter for pedestrian detection at a traffic intersection, showing generated bounding boxes for multiple pedestrians in respective sample test cases. Some pedestrians are marked in respective camera images.

In FIG. 8(a), there is a single pedestrian waiting to cross the road while vehicles are moving, and CoSense accurately predicts the pedestrian's bounding box. CoSense also performs well in generating accurate bounding boxes for other static and dynamic pedestrians (see FIGS. 8(b), 8(d), and 8(e)). FIG. 8(c) represents a scenario with no pedestrians, and the system predicts that accurately as well. Also, FIGS. 9(a) through 9(e) each graphically and visually represent respective example results of presently disclosed subject matter for vehicle detection at a traffic intersection, showing generated bounding boxes for multiple vehicles in respective sample test cases. Some vehicles are marked in camera images, including those that are crossing the street or waiting for a traffic signal. CoSense accurately generates depth images for all vehicles. While it can occasionally output spurious blobs on the bounding boxes, we can easily discard them since they are small in size and irregular in shape.

Figures 10A, 10B:
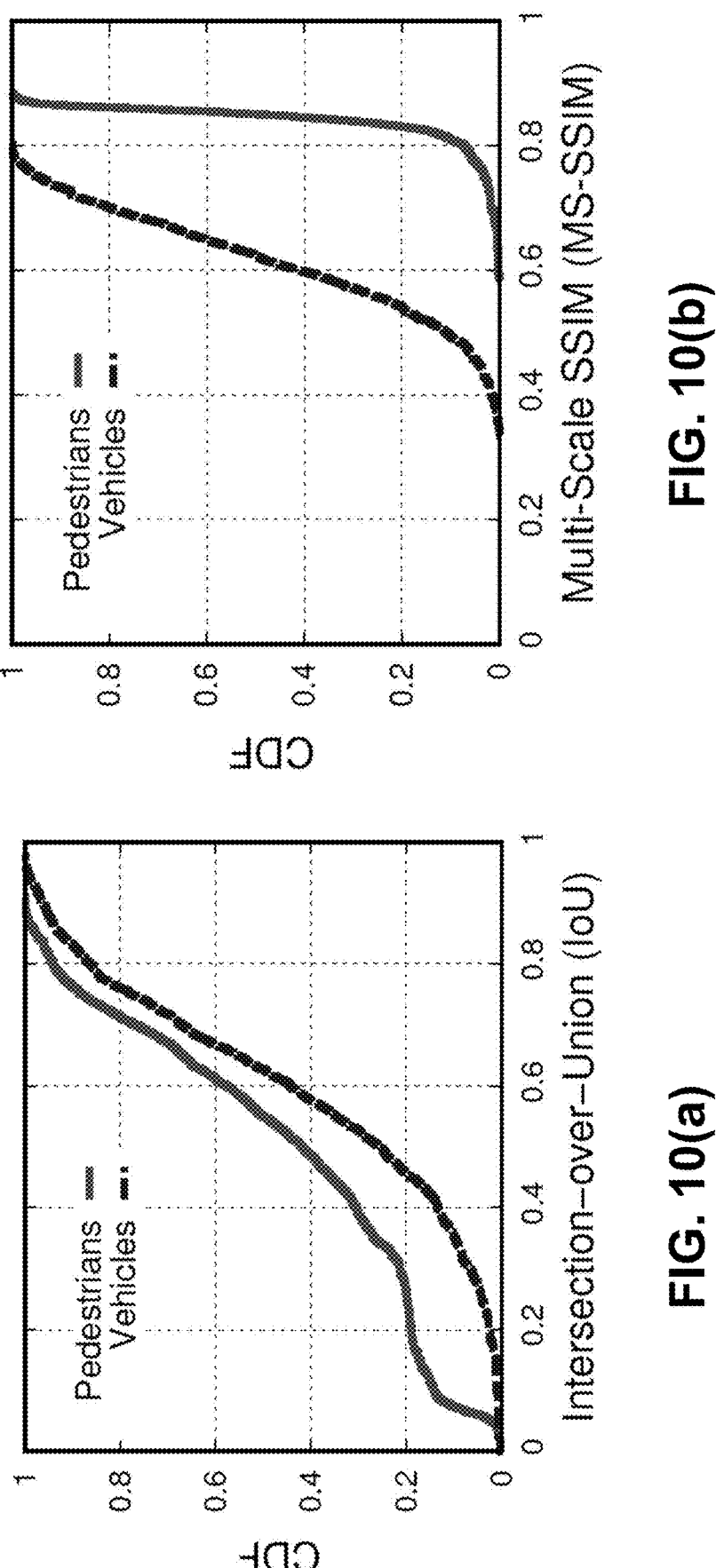
FIGS. 10(*a*), 10(*b*), and 10(*c*) graphically illustrate respective results for different metrics from the base model for pedestrians and vehicles detection, including respectively 10(*a*) Intersection-over-Union (IoU), 10(*b*) MS-SSIM, and 10(*c*) Mean depth error.
Figures 10C, 11A:
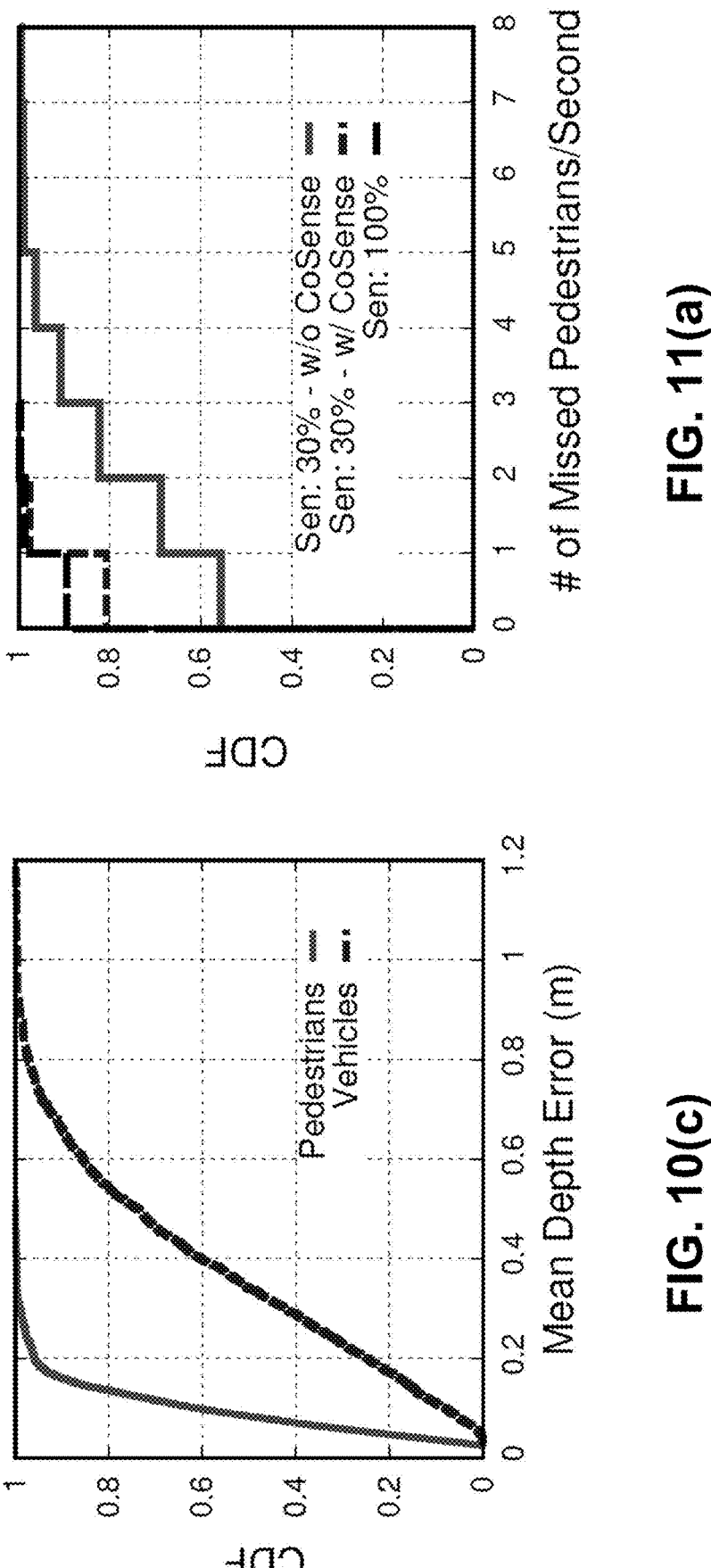
FIGS. 11(*a*), 11(*b*), and 11(*c*) graphically illustrate respective results for number of pedestrians missed per second near the traffic intersection with and without the presently disclosed CoSense system, including respectively 11(*a*) 30% sensing overhead, 11(*b*) 60% overhead, and 11(*c*) 90% overhead.

FIGS. 10(a), 10(b), and 10(c) graphically illustrate respective results for different metrics from the base model for pedestrians and vehicles detection, including respectively 10(a) Intersection-over-Union (IoU), 10(b) MS-SSIM, and 10(c) Mean depth error (MAE) between the ground truth and generated bounding boxes across all the test samples for pedestrians and vehicles. For pedestrians, CoSense achieves a median IoU of 0.55 and 90th percentile IoU of 0.76, indicating a good match across most of the samples. For vehicles, CoSense achieves a median IoU of 0.62 and 90th percentile IoU of 0.83. The detection performance for vehicles is better compared to pedestrians. This is intuitively correct because vehicles have a larger and smoother surface area compared to pedestrians and can reflect strong mmWave signals.

FIG. 10(b) shows the median MS-SSIM of CoSense generated bounding boxes are 0.85 and 0.62 for pedestrians and vehicles, respectively. This result indicates that CoSense accurately generates the bounding box for pedestrians and vehicles. Furthermore, FIG. 10(c) shows the CoSense's performance in identifying the depth of the vehicles and pedestrians from the mmWave device. CoSense achieves a median depth error of 0.08 m and 0.34 m for pedestrians and vehicles, respectively. Vehicles have higher depth error than pedestrians because the object is larger and has more range variation from mmWave device. Still, the 90th percentile depth error does not exceed more than 0.66 m, indicating high accuracy in ranging for both pedestrians and vehicles. The high accuracy result on pedestrians and vehicles indicates that the azimuth angular resolution of mmWave heatmaps and context-aware learning network enables such high similarity between generated and ground truth depth images.

2.2.2 Pedestrians and Vehicles Miss Rate

We now evaluate CoSense in predicting the number of pedestrians and vehicles passing through the scene per second. To count the number of pedestrians, we initially use all available sensing samples and assume YOLOv5 detection on camera images as the ground truth in clear weather conditions. Next, we track pedestrians using bounding overlap and identify the times when each pedestrian enters or leaves the data frames to count the total number of pedestrians in each frame. If a frame was dedicated to networking, we count any pedestrians that left or entered the frame as a miss count. For instance, if the sensing overhead is reduced to 30%, we count all pedestrian changes during the remaining 70% of the time as missed counts. We aggregate these numbers over one second and define the Miss Rate. We follow a similar process for counting the number of vehicles missed per second. If CoSense fails to predict the bounding box of a pedestrian or vehicle, we count it as a miss.

Figure 11C:
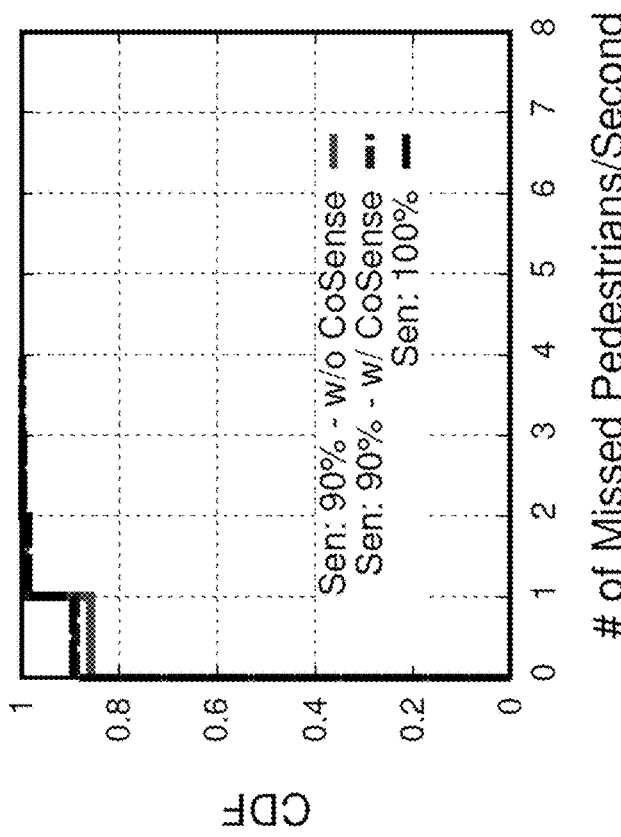
Figure 11B:
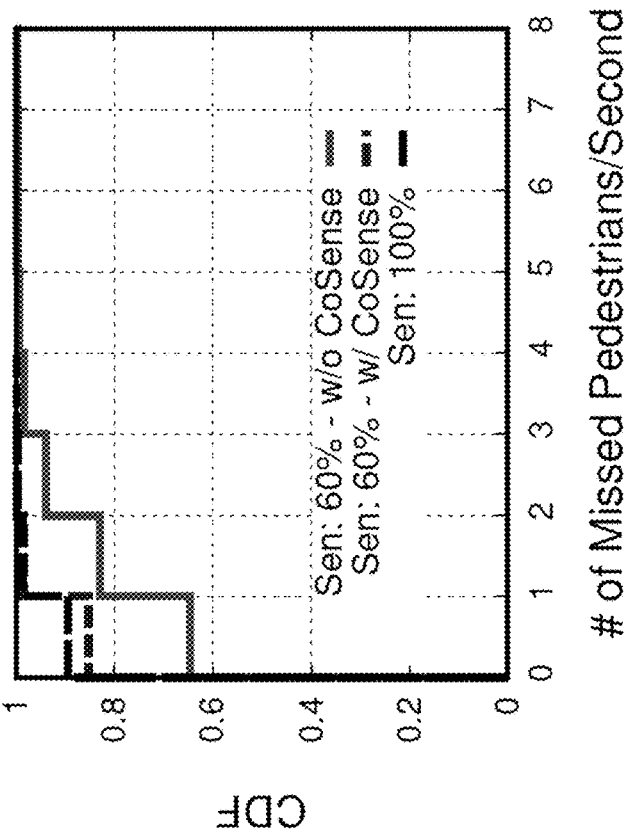

FIGS. 11(a) through 11(c) show the number of pedestrians missed with and without CoSense at various sensing overheads. In particular, FIGS. 11(a), 11(b), and 11(c) graphically illustrate respective results for number of pedestrians missed per second near the traffic intersection with and without the presently disclosed CoSense system, including respectively 11(a) 30% sensing overhead, 11(b) 60% overhead, and 11(*c*) 90% overhead. At 30% sensing overhead, without CoSense, we may miss up to 8 pedestrians per second. In contrast, the maximum miss rate is reduced to 2 from 8 with CoSense's context-aware object detection networks.

Figures 12A, 12B:
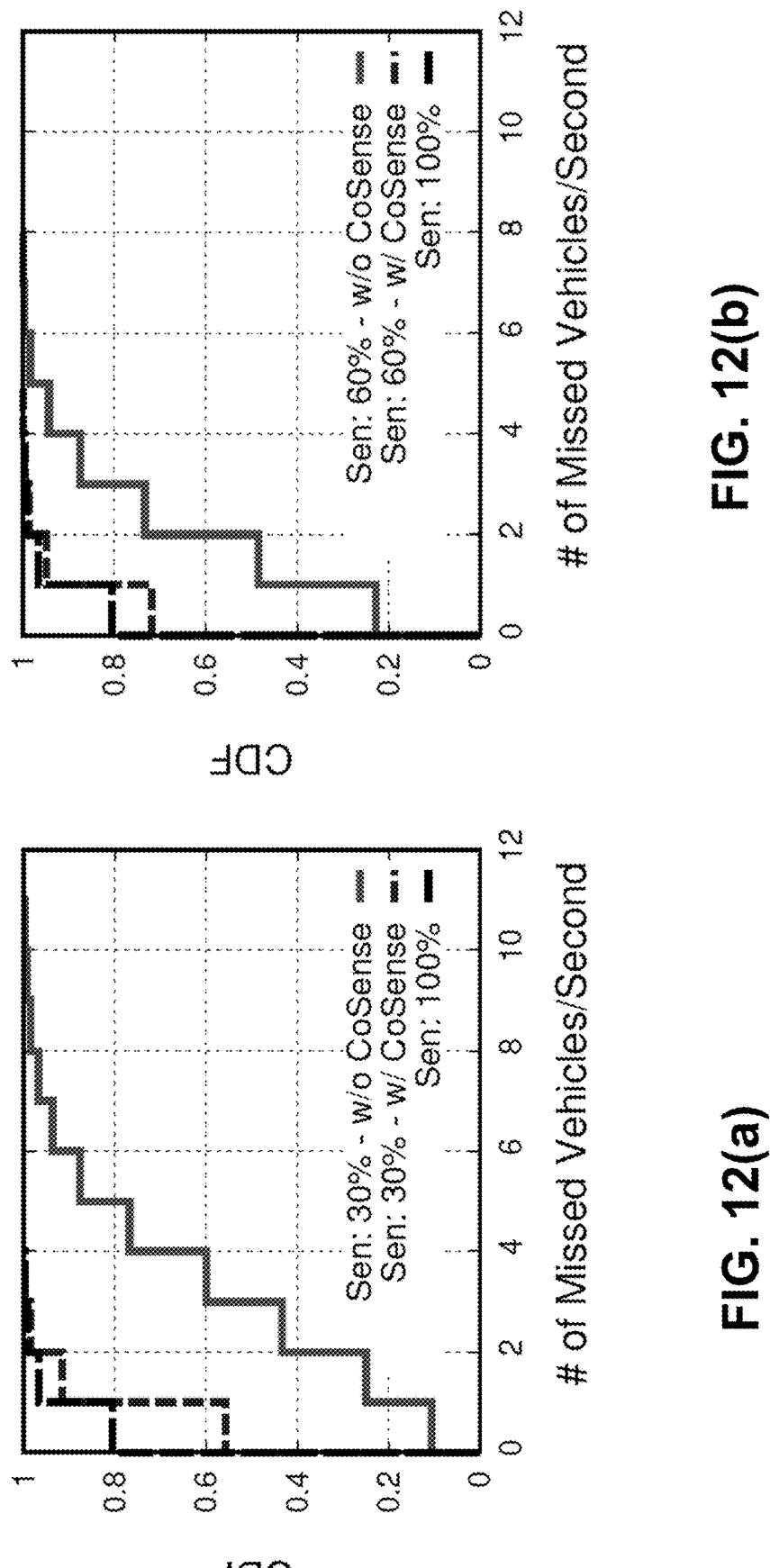
FIGS. 12(*a*), 12(*b*), and 12(*c*) graphically illustrate respective results for number of vehicles presently disclosed CoSense system, including respectively 12(*a*) 30% sensing overhead, 12(*b*) 60% overhead, and 12(*c*) 90% overhead.
Figure 12C:
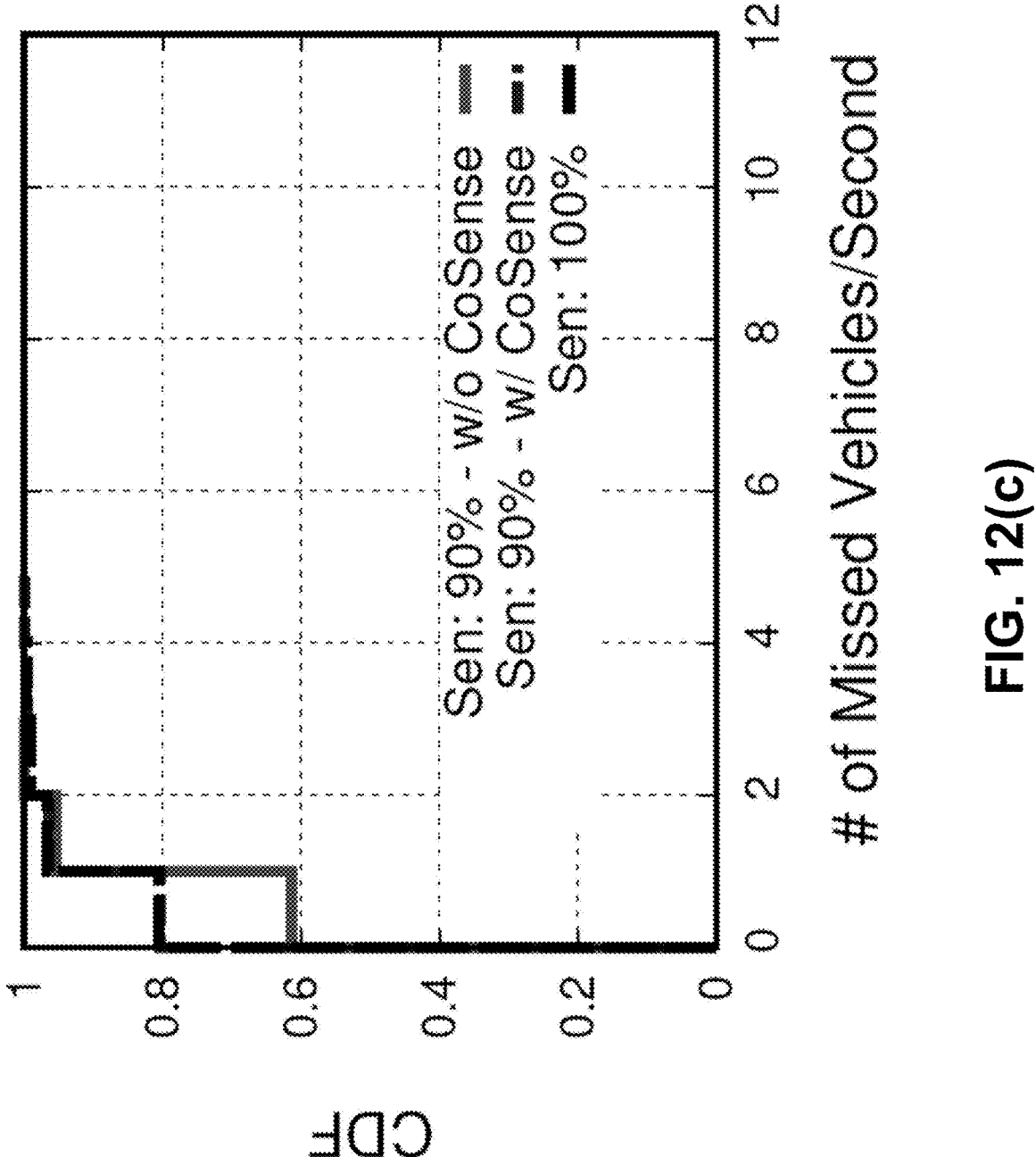

Similarly, FIG. 12(*a*) through 12(*c*) show the number of missed vehicles with identical sensing overheads. In particular, FIGS. 12(*a*), 12(*b*), and 12(*c*) graphically illustrate respective results for number of vehicles presently disclosed CoSense system, including respectively 12(*a*) 30% sensing overhead, 12(*b*) 60% overhead, and 12(*c*) 90% overhead. At 30% sensing overhead, without CoSense, we may miss up to 10 vehicles per second, but CoSense reduces this to 3 vehicles per second at most. We observe a higher miss rate for vehicles compared to pedestrians because they are far from the mmWave device, and hence some reflections from them may be missed in some data samples.

2.2.3 Pedestrian Detection Under Foggy Conditions

Figures 13A, 13B, 13C:
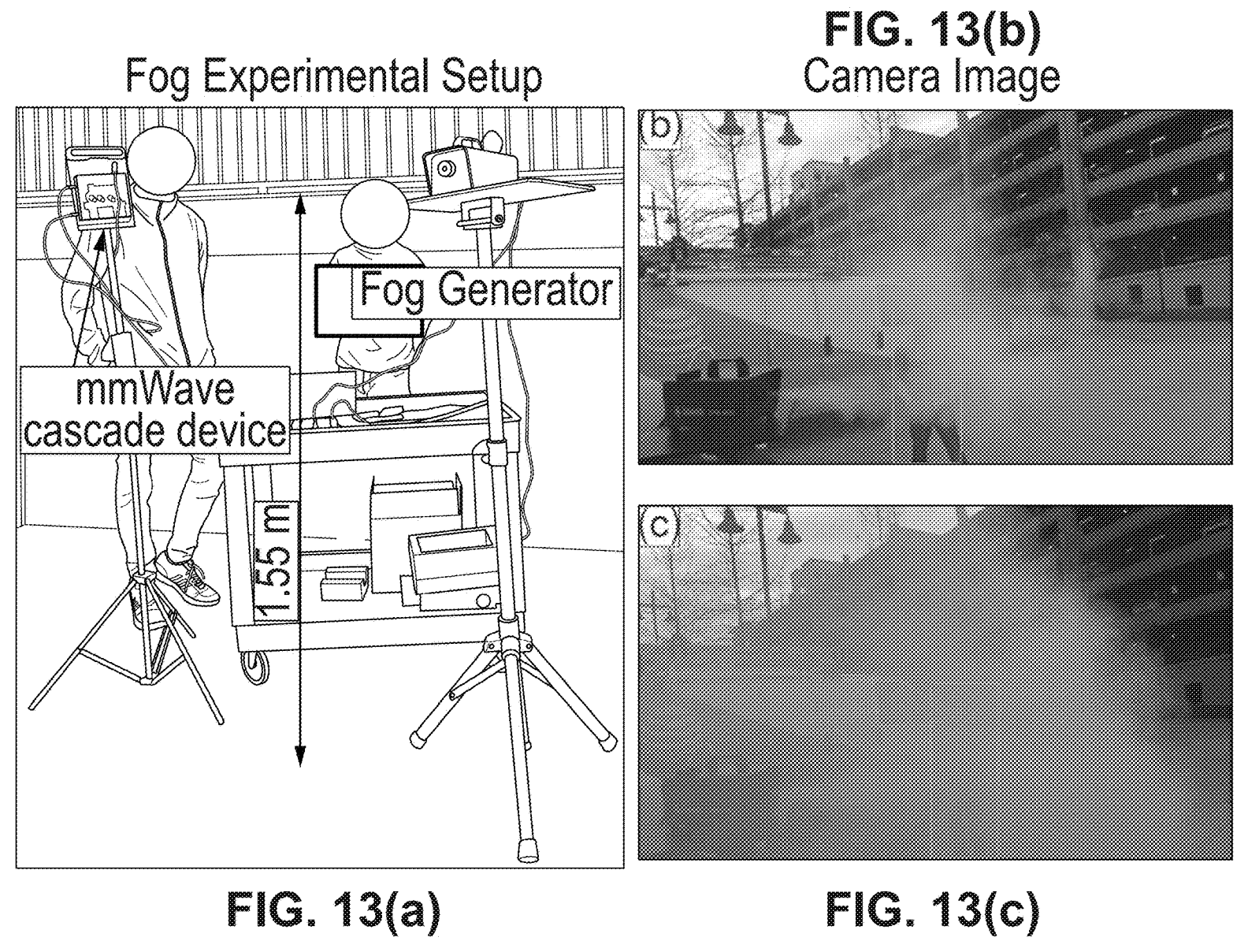

We now evaluate the performance of CoSense under foggy conditions. To create a controlled and realistic experiment, we use artificial fog generated by a water-based fluid fog machine, following the methods described in previous works [30, 31, 32]. FIG. 13(*a*) visually illustrates an example of an experimental setup used with testing the presently disclosed subject matter, and includes for example a DFM-400S fog machine [33]. In particular, FIG. 13(*a*) illustrates an experimental setup of fog trials for pedestrian detection at 2.5 m. We collect data samples from two pedestrians with different body somatypes, who stood in a natural pose at a distance of approximately 2.5 meters from the setup. We process the mmWave samples through the pre-trained bounding box generator model and compare the output in foggy conditions with ground truth in clear conditions.

FIGS. 13(*b*) and 13(*c*) show two sample (originally RGB) images under medium and poor visibility, in which it is difficult to detect the pedestrian. FIG. 13(*d*) graphically illustrates two respective exemplary dynamic and static heatmap images created under the medium and poor visibility conditions represented per FIGS. 13(*b*) and 13(*c*), respectively. FIG. 13(*e*) graphically illustrates two respective mapped bounding boxes, created by the presently disclosed CoSense system, for the two pedestrians images under the medium and poor visibility conditions represented per FIGS. 13(*b*) and 13(*c*), respectively. As seen, the dynamic heatmaps of FIG. 13(*d*), and corresponding bounding boxes of FIG. 13(*e*), show a concentrated energy peak at the range of approximately 2.5 meters, corresponding to the sway movement of the pedestrians. CoSense deep learning model leverages these unique heatmap features to accurately identify the bounding box of the pedestrians and predict their range.

Figures 13D, 13E, 14:
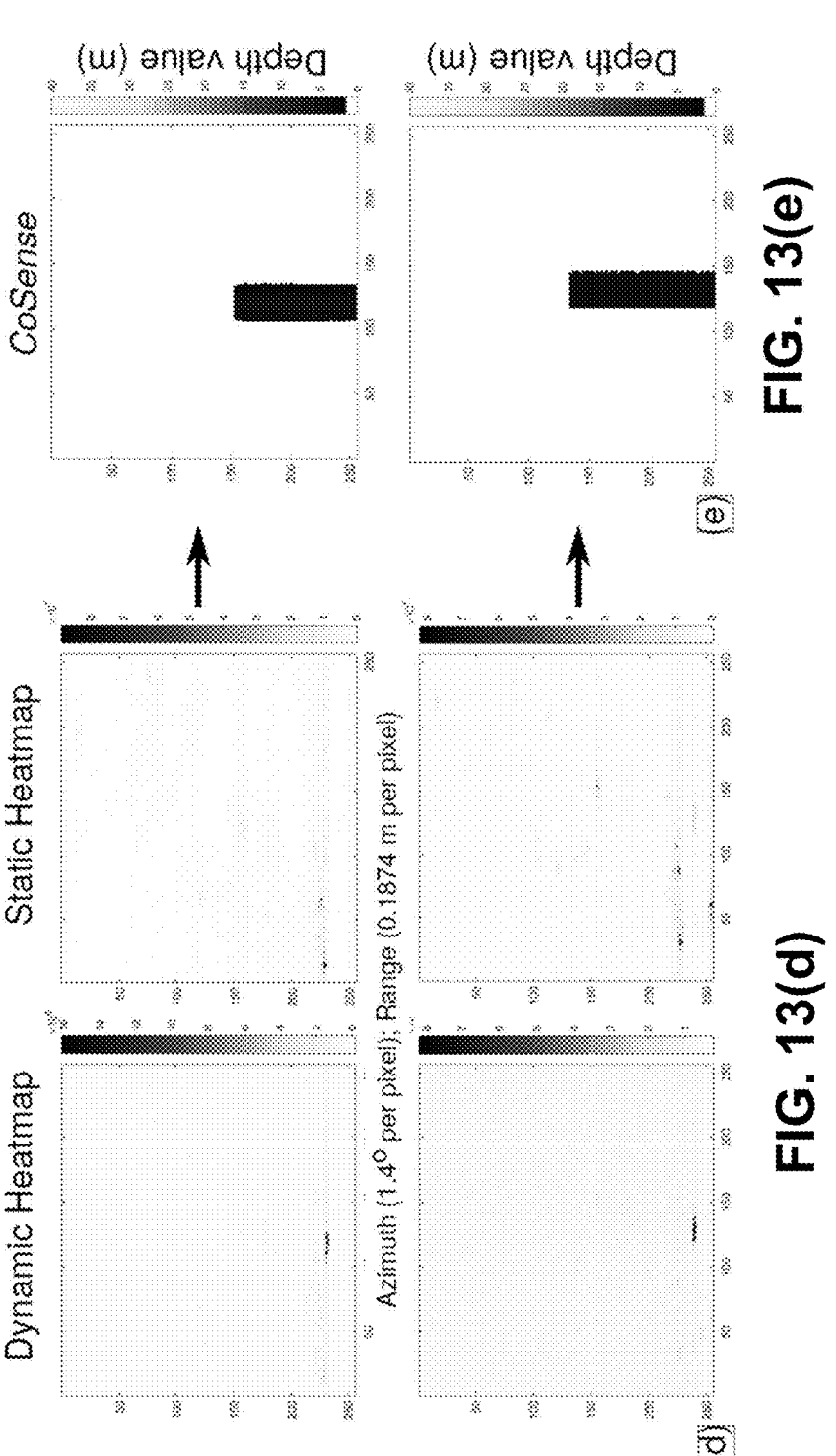
FIG. 14 is a table (Table 3) summarizing pedestrian detection under the medium and poor visibility conditions represented per FIGS. 13(*b*) and 13(*c*), respectively.

FIG. 14 is a table (Table 3) summarizing pedestrian detection under the medium and poor visibility conditions represented per FIGS. 13(*b*) and 13(*c*), respectively. In other words, FIG. 14 (Table 3) summarizes CoSense's performance on over 100 data samples for each pedestrian. We observe a median IoU of 0.78 and 0.89, median MS-SSIM of 0.93 and 0.94, and median depth errors of 0.03 m and 0.02 m for pedestrian 1 and pedestrian 2, respectively. This high accuracy is expected since mmWave signals can easily penetrate through fog.

This written description uses examples to disclose the presently disclosed subject matter, including the best mode, and also to enable any person skilled in the art to practice the presently disclosed subject matter, including making and using any devices or systems and performing any incorpo-rated methods. The patentable scope of the presently disclosed subject matter is defined by the claims, and may include other examples that occur to those skilled in the art. Such other examples are intended to be within the scope of the claims if they include structural and/or step elements that do not differ from the literal language of the claims, or if they include equivalent structural and/or elements with insubstantial differences from the literal languages of the claims. In any event, while certain embodiments of the disclosed subject matter have been described using specific terms, such description is for illustrative purposes only, and it is to be understood that changes and variations may be made without departing from the spirit or scope of the subject matter. Also, for purposes of the present disclosure, the terms "a" or "an" entity or object refers to one or more of such entity or object. Accordingly, the terms "a", "an", "one or more," and "at least one" can be used interchangeably herein.

REFERENCES

[1] Governors Highway Safety Association (GHSA), "New Projection: U.S. Pedestrian Fatalities Reach Highest Level in 40 Years." 2022. [Online]. Available: https://www.ghsa.org/resources/news-releases/GHSA/Ped-Spot-light-Full-Report22

[2] U.S. Department of Transportation-Federal Highway Administration, "About Intersection Safety." 2022. [Online]. Available: https://safety.fhwa.dot.gov/intersection/about/

[3] Centers for Disease Control and Prevention. "Pedestrian Safety." 2022. [Online]. Available: https://www.cdc.gov/transportationsafety/pedestrian_safety/index.html

[4] SAE International. "Taxonomy and Definitions for Terms Related to Driving Automation Systems for On-Road Motor Vehicles." 2022. [Online]. Available: https://www.sae.org/standards/content/j3016_202104/

[5] Dongzhu Xu and Anfu Zhou and Xinyu Zhang and Guixian Wang and Xi Liu and Congkai An and Yiming Shi and Liang Liu and Huadong Ma. "Understanding Operational 5G: A First Measurement Study on Its Coverage. Performance and Energy Consumption." in *ACM SIGCOMM*. 2020.

[6] Wu. Ting and Rappaport. Theodore S. and Collins. Christopher M., "The Human Body and Millimeter-Wave Wireless Communication Systems: Interactions and Implications." in 2015 *IEEE International Conference on Communications (ICC)*, 2015.

[7] Sanjib Sur and Vignesh Venkateswaran and Xinyu Zhang and Parmesh Ramanathan. "60 GHz Indoor Networking through Flexible Beams: A Link-Level Profiling." in *Proc. of ACM SIGMETRICS*. 2015.

[8] Zhang. Feng and Wu, Chenshu and Wang, Beibei and Liu, K. J. Ray, "mmEye: Super-Resolution Millimeter Wave Imaging," *IEEE Internet of Things Journal*, vol. 8, no. 8, 2021.

[9] Guan, Junfeng and Madani, Sohrab and Jog, Suraj and Gupta, Saurabh and Hassanieh, Haitham, "Through fog high-resolution imaging using millimeter wave radar," in *Proceedings of the IEEE/CVF Conference on Computer Vision and Pattern Recognition*, 2020.

[10] Marcus, Michael and Pattan, Bruno, "Millimeter wave propagation: spectrum management implications," *IEEE Microwave Magazine*, vol. 6, no. 2, 2005.

[11] T. S. Rappaport, R. W. H. Jr., R. C. Daniels, and J. N. Murdock, *Millimeter Wave Wireless Communications*. Prentice Hall, 2014.

[12] B. Mamandipoor, G. Malysa, A. Arbabian, U. Madhow, and K. Noujeim, "60 GHz Synthetic Aperture Radar for Short-Range Imaging: Theory and Experiments," in *IEEE Asilomar Conference on Signals, Systems and Computers*, 2014.

[13] D. M. Sheen, D. L. McMakin, and T. E. Hall, "Three-Dimensional Millimeter-Wave Imaging for Concealed Weapon Detection," *IEEE Transactions on Microwave Theory and Techniques*, vol. 49, no. 9, 2001.

[14] Devalla, Vindhya and Singh, Rajesh and Mondal, Amit Kumar and Kaundal, Vivek, "Design and development of object recognition and sorting robot for material handling in packaging and logistic Industries," *International Journal of Science and Advanced Technology*, vol. 2, no. 9, 2012.

[15] Wiech, Michael and Böllhoff, Jörg and Metternich, Joachim, "Development of an optical object detection solution for defect prevention in a Learning Factory," *Procedia Manufacturing*, vol. 9, 2017.

Dhabliya, Mr Dharmesh and Dhabalia, Ms Ritika, "Object Detection and Sorting using IoT," *International Journal of New Practices in Management and Engineering*, vol. 3, no. 04, 2014.

Feng, Di and Harakeh, Ali and Waslander, Steven L and Dietmayer, Klaus, "A review and comparative study on probabilistic object detection in autonomous driving," *IEEE Transactions on Intelligent Transportation Systems*, vol. 23, no. 8, 2021.

[18] Chen, Xiaozhi and Kundu, Kaustav and Zhang, Ziyu and Ma, Huimin and Fidler, Sanja and Urtasun, Raquel. "Monocular 3d object detection for autonomous driving," in *Proceedings of the IEEE conference on computer vision and pattern recognition*, 2016.

[19] Kumar, Chethan and Punitha, R and others, "Yolov3 and yolov4: Multiple object detection for surveillance applications," in 2020 *Third international conference on smart systems and inventive technology (ICSSIT)*. IEEE, 2020.

[20] Saini, Dharmender and Thakur, Narina and Jain, Rachna and Nagrath, Preeti and Jude, Hemanth and Sharma, Nitika, "Object Detection in Surveillance Using Deep Learning Methods: A Comparative Analysis," in *Inventive Computation and Information Technologies: Proceedings of ICICIT 2020*, 2021.

[21] He, Kaiming and Gkioxari, Georgia and Dollar, Piotr and Girshick, Ross, "Mask R-CNN," in 2017 *IEEE International Conference on Computer Vision (ICCV)*, 2017.

[22] Mehdi Mirza and Simon Osindero, "Conditional Generative Adversarial Nets," 2014. [Online]. Available: https://arxiv.org/abs/1411.1784

[23] Mao, Xiao-Jiao and Shen, Chunhua and Yang, Yu-Bin, "Image restoration using convolutional autoencoders with symmetric skip connections," *arXiv preprint arXiv: 1606.08921*, 2016.

[24] Tschannen, Michael and Bachem, Olivier and Lucic, Mario, "Recent advances in autoencoder-based representation learning," *arXiv preprint arXiv: 1812.05069*, 2018.

[25] Goodfellow, Ian J. and Pouget-Abadie, Jean and Mirza, Mehdi and Xu, Bing and Warde-Farley, David and Ozair, Sherjil and Courville, Aaron and Bengio, Yoshua, "Generative Adversarial Networks," in *ACM International Conference on Neural Information Processing Systems*, 2014.

[26] Hao Ge and Yin Xia and Xu Chen and Randall Berry and Ying Wu, "Fictitious GAN: Training GANs with Historical Models," in *European Conference on Computer Vision ECCV 2018*, 2018.

[27] Sandler, Mark and Howard, Andrew and Zhu, Menglong and Zhmoginov, Andrey and Chen, Liang-Chieh, "Mobilenetv2: Inverted residuals and linear bottlenecks," in *Proceedings of the IEEE conference on computer vision and pattern recognition*, 2018.

[28] James, William and Stein, Charles, "Estimation with quadratic loss," *Breakthroughs in statistics: Foun-dations and basic theory*, pp. 443-460, 1992.

[29] Hore, Alain and Ziou, Djemel, "Image quality metrics: PSNR vs. SSIM," in 2010 *20th international conference on pattern recognition. IEEE*, 2010, pp. 2366-2369.

[30] Madani, Sohrab and Guan, Jayden and Ahmed, Waleed and Gupta, Saurabh and Hassanieh, Haitham, "Radatron: Accurate detection Using Multi-resolution Cascaded MIMO Radar," in *Computer Vision—ECCV 2022: 17th European Conference, Tel Aviv, Israel*, Oct. 23-27, 2022, *Proceedings, Part XXXIX*, 2022.

[31] Yosef Golovachev and Ariel Etinger and Gad A. Pinhasi and Yosef Pinhasi, "Propagation Properties of Sub-Millimeter Waves in Foggy Conditions," *Journal of Applied Physics*, vol. 125, no. 151612, 2019.

[32] _____, "Millimeter Wave High Resolution Radar Accuracy in Fog Conditions—Theory and Experimental Verification," *MDPI Sensors*, vol. 18, no. 7, 2018.

[33] Donner, "DMF-400S," 2023. [Online]. Available: https://donnerca.com/

What is claimed is:

1. A Method for vehicle and pedestrian monitoring for safety at traffic intersections in all weather conditions, comprising:

providing a plurality of 5g picocells, operating at mmWave frequency bands, and associated with at least one target traffic intersection scene to be monitored;

obtaining reflected mmWave data from the plurality of picocells associated with the at least one target scene;

and inputting the obtained reflected mmWave data into a deep learning model trained to recover missing data about the target scene from the obtained reflected mmWave data while enabling coexistence of networking and sensing by the picocells wherein the trained deep learning model uses context-aware object detection with a conditional Generative Adversarial Network (cGAN) to recover sensing samples otherwise intermittently unavailable;

wherein the coexistence of the networking and sensing is enabled by using "slot sequence" ($S_{timestamps}$) from the 5G network protocol.

2. The method according to claim 1, further comprising conducting collision prevention through at least one of warning pedestrian traffic and vehicle control, based on model output.

3. The method according to claim 1, wherein the obtained reflected mmWave data relates to at least one of real-time pedestrian and vehicular traffic at intersections, their speeds, vehicle proximity to intersection stop bars, occupied lanes, and vehicle types, to enable traffic monitoring and management.

4. The method according to claim 1, further comprising fully illuminating the at least one target scene by transmitting wireless signals and receiving them from reflecting off of different plural objects within the at least one target scene, to map the entire environment including static and dynamic objects within the at least one target scene, regardless of visibility or weather conditions.

5. The method according to claim 1, wherein the trained deep learning model uses the conditional Generative Adversarial Network (cGAN), which has multiple 2D convolution layers, 2D deconvolution layers, and skip connections on its Generator network to produce 2D bounding box depth images from mmWave heatmaps.

6. The method according to claim 5, further including conducting object detection with the trained deep learning model by using all data samples to first conduct dynamic heatmap recovery from missing data samples, and then conduct final object detection including use of recovered frames.

7. The method according to claim 1, wherein the deep learning model comprises a deep learning network with an encoder and decoder that converts the mmWave heatmaps into 2D bounding boxes with depth values.

8. The method according to claim 1, wherein the trained deep learning model uses the conditional Generative Adversarial Network (cGAN), which has a base model comprised of Generator (G) and Discriminator (D) function.

9. The method according to claim 8, further comprising providing two respective base models with same network architecture for pedestrians and vehicles, respectively.

10. The method according to claim 9, further including training the two respective base models including updating network parameters of each model with mmWave heatmaps and corresponding ground-truth depth images of pedestrians and vehicles, respectively.

11. The method according to claim 8, wherein the Discriminator (D) has two encoders used during training of the model for extracting features from mmWave heatmaps and ground-truth depth images, respectively.

12. The method according to claim 11, wherein the Discriminator (D) operates during training of the model to guide Generator (G) to learn to use mmWave heatmaps to generate output close to ground-truth depth images.

13. The method according to claim 12, wherein Discriminator (D) guides Generator (G) during training by generating an output probability value between 0 and 1 with a sigmoid activation function on its output layer, to indicate the closeness of an input depth image to a corresponding ground truth depth image.

14. The method according to claim 13, wherein training is completed whenever Discriminator (D) continuously outputs a probability value close to 0.5 for all the samples, reflecting that Discriminator (D) can no longer distinguish between ground truth and generated samples.

15. The method according to claim 8, wherein during training, mmWave sensing samples are dropped to emulate networking slots, and the majority of the time slots are assigned to network communication since the picocell's primary function is to support required data throughput.

16. The method according to claim 15, wherein during static and dynamic heatmaps are removed and recovered based on different slot sequence configurations.

17. The method according to claim 1, wherein the deep learning architecture predicts dynamic heatmap data, using previous dynamic heatmap data and the dominant reflecting points along with their corresponding velocities to forecast the movements of objects in future dynamic heatmaps.

18. The method according to claim 1, wherein the cGAN-based model comprises a learning framework having a network loss function which is a combination of Mean Squared Error (MSE) used to enforce pixel-to-pixel mapping in reconstructed depth images and Binary Cross Entropy (BCE) to measure the entropy loss of the Discriminator's output, focus on learning to produce accurate bounding boxes and correct depth values of objects rather than focusing on quality of generated image.

19. A system for vehicle and pedestrian monitoring for safety at traffic intersections in all weather conditions, comprising:

a deep-learning model trained with reflected mmWave data from a plurality of picocells associated with at least one target intersection, to recover missing data about the target scene from the obtained reflected mmWave data;

one or more processors; and one or more non-transitory computer-readable media that store instructions that, when executed by the one or more processors, cause the one or more processors to perform operations, the operations comprising:

operating at mmWave frequency bands a plurality of 5g picocells, associated with the at least one target traffic intersection to be monitored;

and conducting collision prevention through at least one of warning pedestrian traffic and vehicle control, based on model output;

wherein the operations further comprise using context-aware object detection with a conditional Generative Adversarial Network (cGAN) to recover sensing samples otherwise intermittently unavailable.

20. The system according to claim 19, wherein the operations further comprise conducting object detection with the trained deep learning model by using all data samples to first conduct dynamic heatmap recovery from missing data samples, and then conduct final object detection including use of recovered frames.

21. The system according to claim 20, wherein the operations further comprise: establishing a base model comprised of Generator (G) and Discriminator (D) functions; and providing two respective base models with same network architecture for pedestrians and vehicles, respectively.

22. The system according to claim 21, wherein the operations further comprise: training the two respective base models including updating network parameters of each model with mmWave heatmaps and corresponding ground-truth depth images of pedestrians and vehicles, respectively; and providing each respective base model with an encoder and decoder that converts the mmWave heatmaps into 2D bounding boxes with depth values.

23. The system according to claim 22, wherein the operations further comprise operating the Discriminator (D) for training of the model by guiding Generator (G) to learn to use mmWave heatmaps to generate output close to ground-truth depth images.

* * * * *